July 15, 1969 J. K. DIXON ET AL 3,455,107
REGENERATIVE GAS TURBINE ENGINE STRUCTURE
Filed May 25, 1967 4 Sheets-Sheet 1

INVENTORS
*Albert N. Addie,*
*John K. Dixon, deceased,*
*Grace Dixon, executrix,*
*Charles J. McDowall, &*
BY *Wilfred C. Oestrike*

*Paul Fitzpatrick*
ATTORNEY

United States Patent Office 3,455,107
Patented July 15, 1969

3,455,107
REGENERATIVE GAS TURBINE ENGINE STRUCTURE
John K. Dixon, deceased, late of Indianapolis, Ind., by Grace Dixon, executrix, Indianapolis, Ind., Albert N. Addie, La Grange Park, Ill., and Charles J. McDowall and Wilfred C. Oestrike, Indianapolis, Ind., assignors to General Motors Corporation, Detroit, Mich., a corporation of Delaware
Filed May 25, 1967, Ser. No. 641,385
Int. Cl. F02c 7/10, 7/20; F23l 15/02
U.S. Cl. 60—39.32                               19 Claims

ABSTRACT OF THE DISCLOSURE

A gas turbine power plant including rotary regenerators. The turbine stator, turbine rotors, and regenerator are individually supported by a frame on which they are mounted with provisions for thermal expansion. The frame is cooled by air circulation. The entire power plant has a three-point mounting and is adapted for locomotive use.

---

Our invention relates to regenerative gas turbine engines. The principal object in the conception and development of the engine has been to provide a large regenerative gas turbine engine particularly suitable for use as a locomotive prime mover.

To some extent, the organization of our power plant resembles that of small power plants previously designed for automotive use such as those described in United States Patents No. 3,116,605 to Amann et al. and No. 3,077,074 to Collman et al. However, both the far greater size of the engine and the differences between automotive and locomotive environments have led to reconsideration of the design of the previous engines mentioned above.

Weight is not a primary consideration in the locomotive engine but compactness in relation to power output remains important. A locomotive engine must be tolerant of shocks and impacts resulting from fast travel of locomotives over uneven track and must tolerate warping or wracking of the basic supporting structure, the locomotive bed plate. Apart from this, the general scaling up of the size of the engine has made certain problems more critical, particularly with respect to supporting the various elements of the engine on a common frame or support structure, preserving proper alignment of engine components, and in supporting the relatively large rotary regenerators and minimizing leakage. Accessibility and relative ease of assembly are difficult to achieve in the locomotive engine.

As will be seen by those skilled in the art from the succeeding description of the preferred embodiment of our invention, we have arrived at a large regenerative power plant suitable for locomotive or other uses, embodying important new features of structure.

The principal objects of our invention are to provide a large gas turbine engine embodying regenerators, to provide such an engine for locomotive duty, to provide an engine of high power and relatively low fuel consumption having dimensions and accessibility characteristics such that it is well suited for installation in locomotives; to provide an improved main frame and support arrangement in a gas turbine engine, and to provide improved mountings for the components of the engine preserving alignment and tolerating relative thermal expansion. The engine with which we are concerned also embodies certain improvements in the rotary regenerator which form the subject matter of Addie U.S. Patent No. 3,384,156 for Rotary Regenerator, these being considered to be distinct from the subject matter particularly described and claimed in this application.

The nature of our invention and the advantages thereof will be clear to those skilled in the art from the succeeding detailed description of the preferred embodiment of the invention and the accompanying drawings thereof in which.

Figure 1:
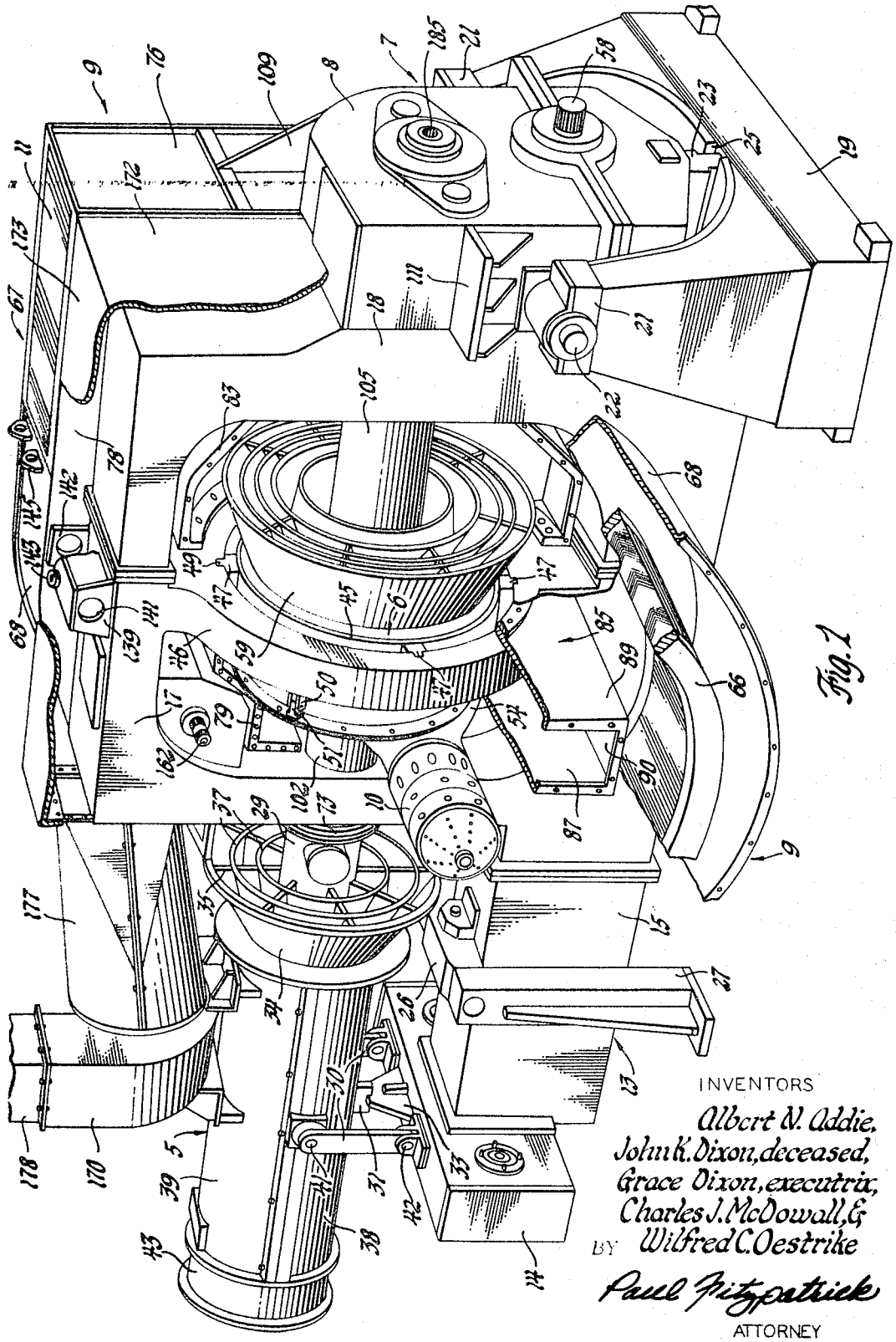
FIGURE 1 is a somewhat schematic axonometric view, with parts cut away, to illustrate the general organization of the engine.

Referring first to FIGURE 1, the engine comprises a multistage axial-flow compressor 5 and a turbine assembly 6 embodying both a high pressure turbine driving the compressor and an independently rotatable low pressure power output turbine. The power output turbine is coupled to the load through a reduction gear 7 in a rigid case 8. Air discharged by the compressor flows through rotary regenerators 9 at each side of the engine to two combustion chambers 10 at each side of the engine (only one of which is shown in FIGURE 1), from the combustion chambers through the turbines, again through the regenerators, and finally through exhausts 11 at the top of the engine.

These parts are supported from a main frame 13 extending generally axially of the engine which comprises, from front to rear, an accessory drive case 14, a box section 15 constituting an oil sump for the engine, a front frame section 17, and a rear frame section 18, the last two combining to provide a rectangular frame comprising side members extending axially of the engine above and below the turbine and cross members extending vertically before and behind the turbine. The several sections 14, 15, 17, and 18 and the gear case 8 are doweled and bolted together to form an integral hollow or box section rigid frame.

Provision is made for supporting this frame from the locomotive bed plate in such manner that bending of the locomotive structure will not be transmitted to the engine. The rear end of the engine is mounted on a rear support 19, which is a massive yoke having mounts 21 for trunnions 22 extending from the side of the gear case 8. Further support and alignment is assured by a key 23 extending axially of the engine bolted to the bottom of the reduction gear case, which is slidable axially in a keyway 25 in the base of the yoke 19. The forward end of the engine frame, specifically the sump 15, is suspended by a universal joint connection including a cross 26 supported on two pedestals 27 which are mounted on the locomotive bed plate. It will be seen that the overall engine is thus provided with a three-point suspension which is tolerant of any flexure of the bed plate and does not transmit bending loads from the locomotive structure to the engine.

The compressor, which extends a considerable distance forward from the front frame section 17 and is quite heavy, is connected rigidly to a shaft housing portion 28 of frame section 17 by a compressor shaft housing 29. Additional support for the compressor case is provided by two swinging links 30 on the accessory drive case 14 which allow axial expansion of the compressor. The structure is further steadied by a key 31 fixed to the under side of the compressor case which can slide fore and aft in a keyway in a bracket 33 extending upwardly from accessory drive case 14. In general, the internal structure of the compressor is immaterial to this invention and may be conventional. Therefore, it is not illustrated. However, it may be noted that the compressor shaft housing 29 is a structure integral with an outlet case 34 to which it is joined by radial struts 35, and that annual diffusing rings 37 are mounted between the shaft housing and case. The compressor case comprises a lower generally semicylindrical section 38 and an upper section 39 joined to it along axial split lines. The supports 30 provide bearings for trunnions 41 and swing on trunnions 42 on the accessory drive case. The compressor also comprises an annular inlet housing and forward bearing support 43.

Considering now the turbine assembly 6, this is housed in a turbine case or stator 45. The turbines comprise a two-stage high pressure turbine and a two-stage low pressure turbine, the rotors and other internal structure of which are not illustrated, since they may follow conventional practice. The case 45 may, as is customary, be made up of rings bolted together for assembly of the turbines, but the ultimate assembly is the single rigid case 45. The turbine case is positively located longitudinally of the engine and its center line is accurately located by means providing for relative thermal expansion of the parts of the engine. This includes a turbine frame 46, which is a massive solid ring encircling the turbine case and welded at upper and lower points to the front frame section 17. The turbine case is centered in the frame by four sets of keys 47 disposed equally around the axis of the turbine and slidable in slots 49 in the turbine frame. The case is located axially by swinging links 50 (FIGURE 1) disposed intermediate the keys 47, which are pivoted to the frame 46 and to brackets 51 on the turbine case.

A burner transition section 54 conducts the combustion products to the turbines from the combustion chambers 10. The combustion chambers 10 and transition section 54 may follow standard practice and, therefore, will not be described in detail. The transition section comprises right- and left-hand portions fixed together at the central vertical plane of the engine. The outlet end of each combustion chamber mounts on the transition section, and the outer end is piloted on a fuel nozzle 55 mounted in the engine casing, to be described.

A high pressure turbine shaft housing 53 (FIGURES 2 and 3) is coaxial with housing 28 and integral with the front frame section 17. The high pressure turbine shaft 60 is journaled in a bearing 61 in shaft housing portion 28 and a bearing 62 in shaft housing portion 53 of the forward frame. The compressor shaft housing 29 bolts to portion 28. A coupling 63 splined to the turbine shaft and to the shaft 64 of the compressor provides a separable connection between the two shafts. A cylindrical shaft housing 65 integral with the rear frame section 18 supports the shaft 57 of the low pressure or power output turbine which delivers power to the reduction gear box where a stepdown gearing (not shown) ultimately delivers the power to an output shaft 58 which may drive a generator or other device. An annular diffuser 59 is provided at the turbine outlet.

The structure which supports the regenerator is a significant feature of our invention. The installation comprises two regenerators 9, one on each side of the engine axis. Each regenerator includes a large regenerator drum 66, these being rotatable about a common axis perpendicular to the turbine axis. The regenerators are housed in a case 67 comprising right-hand and left-hand roughly drum-shaped case sections 68 which are doweled and bolted together at the central vertical plane of the engine. The case 67 includes an inlet portion 69 the halves of which are bolted together at the bolting flange 70. The inlet portion includes a split supporting ring 71 which fits onto and can slide axially on the shaft housing 28. A bellows 73 bolted to this ring and held between the bolting flanges of the shaft housings 28 and 29 provides the inner boundary of the flow path from the compressor into the regenerator, which path lies around the split ring 71 and through openings 72 in the front of the regenerator case at each side of the bolting flange 70. The compressor outlet case 34 is connected to the regenerator case portion 69 by an expansible and contractable annulus 74 including a bellows 75. Thus, the flow path from the compressor into the regenerators is defined, and the forward end of the regenerator casing 67 is located radially with respect to the engine with freedom to expand axially of the engine.

In other words, the discharge from compressor 5 flows through annulus 74 into the generally drum-shaped main portion of the regenerator case ahead of and at each side of the engine frame through openings 72. Each regenerator case section 68 includes a cover which defines the vertical wall remote from the engine axis. The section also includes a sheet metal wall 76 extending continuously around the exterior of the regenerator drum from the outlet 11 around the front, under the bottom, and back up the rear to terminate at the rear edge of the outlet 11. It also includes an inner wall 78 at the side nearer the axis of the engine which wall is broken by an opening at 79 forwardly of the turbine and an opening at 81 rearwardly of the turbine. In addition to the bolting flange 70 previously mentioned, each section 68 has a bolting flange 82 forwardly of the turbine and a bolting flange 83 rearwardly of the turbine on the vertical center plane of the engine. The bolting flanges are connected to the vertical walls 78 by laterally extending wall portions such as 80 (FIGURE 3) which extend within the main frame sections 17 and 18. Dowels at points 84 assure correct alignment of the sections. Thus, when the two casing sections 68 are joined, a single regenerator casing 67 is defined having an entrance for compressed air at 72 and two outlets for exhaust gas at 11, one in each casing section, the sections communicating through openings 79 and 81.

The matrices 66 are disposed generally concentrically with the generally cylindrical casing 67. The regenerator includes a bulkhead 85. This bulkhead and main seals 86 block flow of gas directly from the inlet to exhaust, causing it to flow radially inward through the two matrices 66 to a space within the matrix within which the combustion chambers 10 are mounted and from which it flows through the combustion chambers and the transition section 54 into the turbine. From the turbine the gas flows through the diffuser 59 into a space within the matrix and flows radially outward through the matrices to the exhausts 11. The bulkhead 85 is a part of the regenerator casing. It is a hollow structure having a generally rectangular external outline as viewed along the axis of the engine or from the side of the engine and having an annular or circular internal configuration where it extends around the turbine case 45. Thus, the bulkhead has a front wall 87, a rear wall 89, a bottom wall 90, and a top wall 91. Suitable reinforcing plates such as 92 strengthen the bulkhead structure to resist the compressor discharge pressure. The ends of the bulkhead at the outside of the engine are open for ventilating the turbine case with fresh air.

Figure 2:
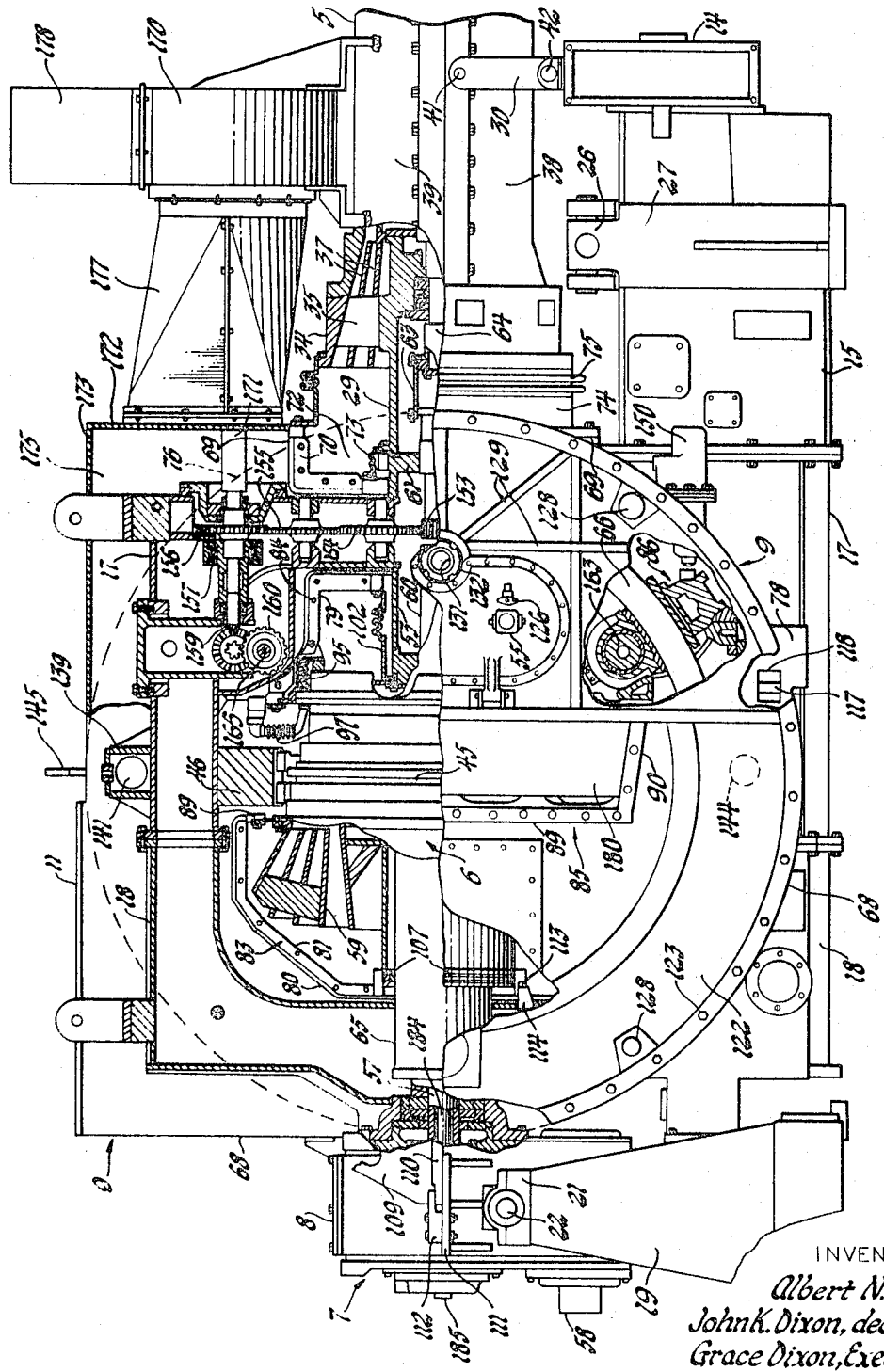
FIGURE 2 is a side elevation view of the engine with parts cut away principally in a vertical plane passing through the central axis of the engine.
Figure 3:
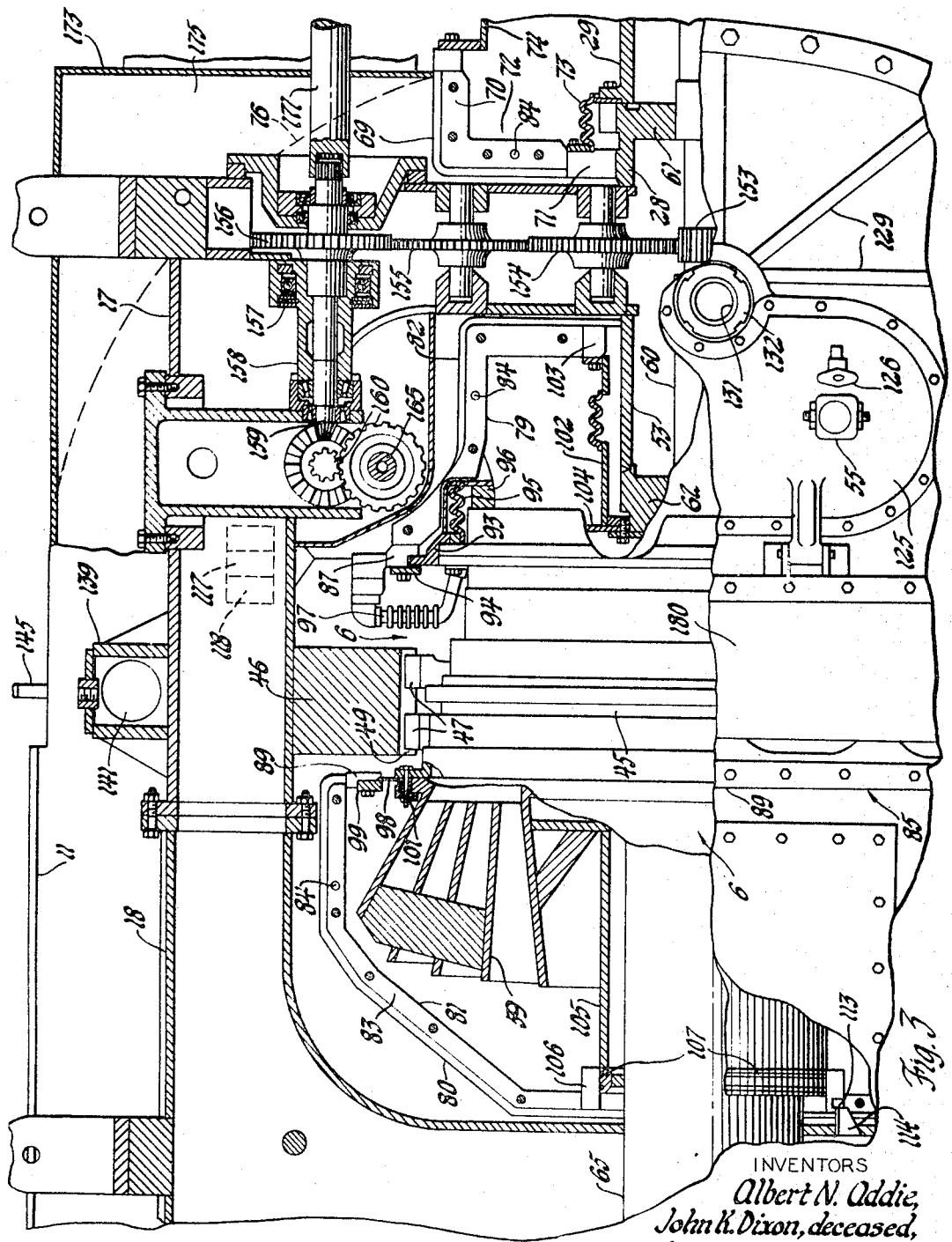
FIGURE 3 is an enlarged view of a portion of FIGURE 2.

To prevent venting of motive fluid, and bypassing of the turbine by flow between the regenerator case and turbine, seals are provided between the bulkhead and turbine case. The front seal between bulkhead and turbine comprises a ring 93 which is radially movable between the bulkhead wall 87 and a ring 94 bolted to it. Ring 93 is connected by an axially expansible bellows 95 to a ring 96 bolted to the front end of the turbine case 45. The seal embodying the radial slip connection and the bellows allows relative expansion or shifting both axially and radially between the turbine case and the regenerator case but blocks compressed air from flowing out of the space forwardly of the turbine in any way except through the turbine. The flexible conduit 97 which appears in FIGURE 2 is means for conveying cooling air into the turbine, which will not be further described. The rear seal between the rear wall 89 of the bulkhead and the turbine case comprises a thin annular plate 98 which is caught between a ring 99 and the bulkhead and also between a ring 101 and the turbine case, these rings being bolted to the bulkhead and turbine case, respectively. This seal, of course, has substantially atmospheric pressure on both sides of it. It serves to prevent any leakage of exhaust gases into the space around the turbine.

An annular heat shield 102, including an expansible bellows section, is fixed to a ring 103 comprising two halves, one on each matrix case section, and to a front wall 104 of the turbine case. The space between the heat shield and the shaft support 53 and between bellows 73 and support 62 is vented through a clearance between the regenerator case and the vertical cross portion of front frame section 17. A cylindrical heat shield 105, which includes the inner member of the turbine diffuser 59, surrounds the power turbine shaft housing 65 and terminates short of the vertical cross portion of rear frame section 18. A split ring 106, each half of which is integral with a regenerator case section 68, slides on the heat shield, piston ring seals 107 being disposed between them to prevent leakage of exhaust gas. This is not the rear support for the regenerator case 67.

The regenerator rear support is provided at the rear of each case section 68 by a supporting foot 109, the lower surface of which is defined by a plate 110 slidable upon a plate 111 fixed to and extending from the gear case 8. A keeper 112 acts to prevent strong vertical shocks from displacing the regenerator upwardly. The foot 109 may slide both radially and axially of the engine on the plate 111 as the regenerator case expands. Alignment of the rear end of the regenerator case laterally of the engine is assured by a slot or keyway 113 in the split plane of ring 106 below the shaft housing which engages a key 114 (FIGURE 2) fixed to frame section 18 below the shaft housing. Fore and aft location of the regenerator case 9 is accomplished by vertical keyways 117 in bosses 118 on the inner wall 78 of each section 68, one being shown in FIGURE 2 near the bottom of the case section. A similar keyway 117 (FIGURE 3) is located near the top of the section in the same fore and aft plane. These keyways are engaged by projeitions (not illustrated) extending laterally from the upper and lower arms of front frame section 17. Thus, when the two regenerator case sections are bolted together they form a unitary case 67 which is located axially of the engine by the four keys in ways 117, located radially at the forward end by ring 71, located vertically at the read end by feet 109, and located laterally of the engine at the rear by the key 114. The case is thus free to expand but is centered at a point approximately at the center of the entrance to the turbine and is positively located in all directions of translation and rotation.

Figure 4:
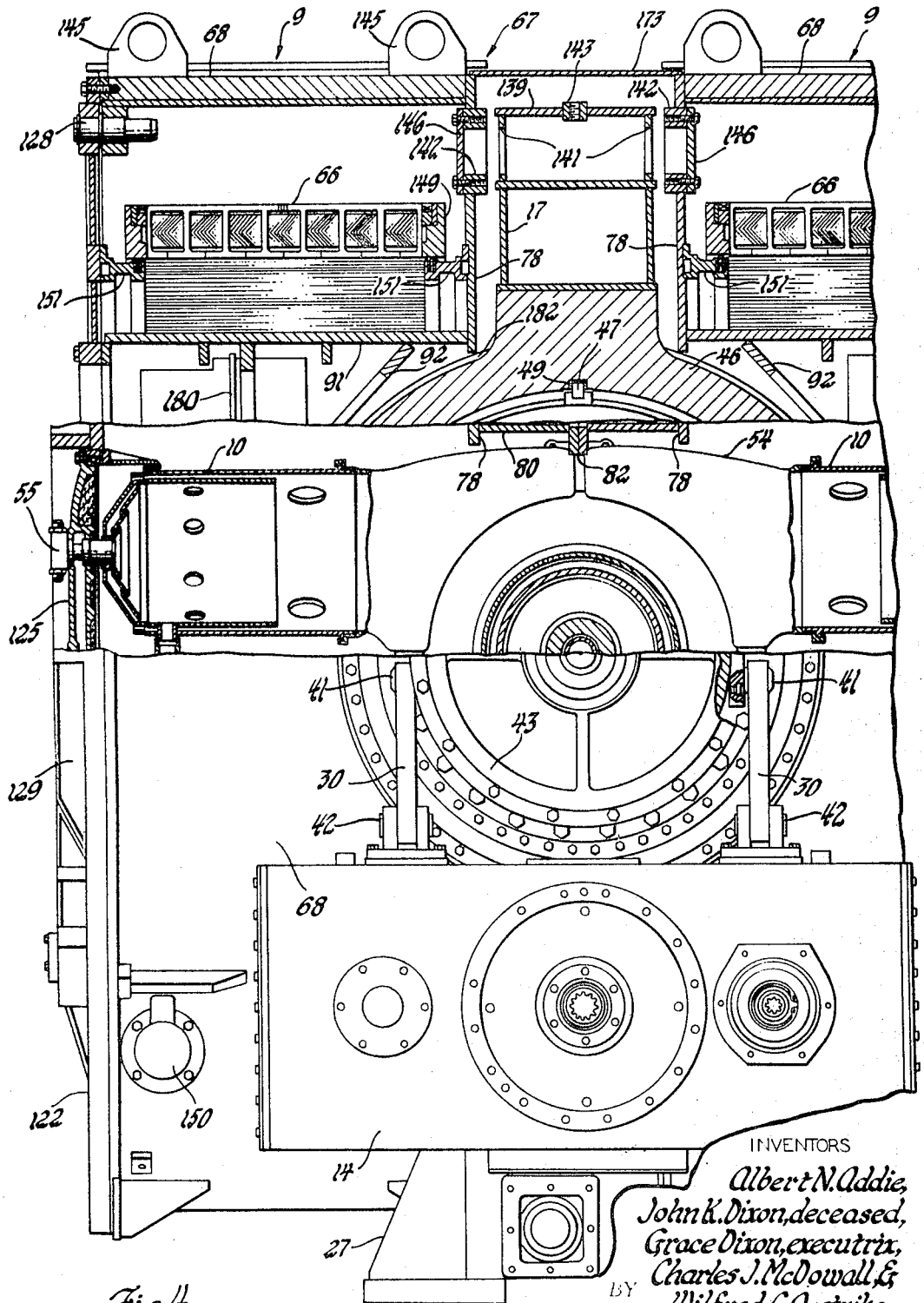
FIGURE 4 is a front elevation view of the engine with parts cut away.

The two outer or side walls of the matrix case are mainly provided by cover plates 122 of circular outline, large enough to permit installation and removal of the matrices. The margins of these plates are secured by a ring of bolts 123. The cover plates have a rectangular opening disposed over the lateral edges of the bulkhead 85 and are additionally bolted to the front and rear and upper and lower walls of the bulkhead. Suitable access plates are provided in the covers 122. Hinged combustion chamber covers 125 mount the two fuel nozzles 55 and igniters 126 for the combustion chambers. Precise alignment of the cover plates 122 with the case section 68 is insured by three dowels 128 (FIGURES 2 and 4). The details of the doweling are not significant, but it is important that the cover be accurately located on the case section, since all of the working parts of the regenerator are supported on the wall 78 and cover 122. The forward part of the cover which must contain compressor discharge pressure is reinforced by ribs 129. The cover is further reinforced by a tubular stay 131 (FIGURE 3) extending parallel to the matrix axis. The stay has a head (not illustrated) bearing against a beam (not illustrated) extending at the side of frame section 17 connecting to rings 71 and 103 of the regenerator case. The outer end of the stay extends through a hole in cover 122 and is retained by a spanner nut 132 threaded on the stay after the cover is installed.

Since the case sections 68 are quite large and heavy, the engine incorporates means to facilitate the alignment and mounting of them. A bracket 139 welded to the upper surface of frame section 17 has two aligned bores 141 through which a large cylindrical bar or dowel (not illustrated) may be inserted. Each casing section wall 78 has an opening in it within which is welded a ring 142 (FIGURE 4) having a central bore corresponding to and normally in alignment with the bores 141. When the engine is being assembled, a dowel is inserted through bore 141 and is retained by a set screw (not shown) threaded into boss 143 in bracket 139. Similar provision is made near the bottom of the case wall for a second aligning dowel fitted in a tube 144 (FIGURE 2) extending through the engine frame. The case sections can be brought into place by a crane coupled to eyes 145 and the case rings 142 are fitted over the upper and lower dowels to suspend the casing sections in proper alignment with each other. After the case sections are bolted together, the dowels are removed and a closure plate 146 is bolted over each ring 142.

In general, the regenerators as such, apart from the casing arrangement and supports, are the subject of other patent applications and the regenerator will not be described in detail in this application. The matrix drums 66 may be of any suitable configuration, the preferred one being of the general character of that described in abandoned United States patent application Ser. No. 484,219 of Albert N. Addie and Jack P. Hart, filed Sept. 1, 1965, for Regenerator Matrix. The drums 66 pass through main seals 86, one of which is shown in FIGURE 2, the other being approximately 120° counterclockwise around the matrix in FIGURE 2 from the one illustrated. These main seals extend between the bulkhead 85 and the peripheral wall 76 of the casing and from the inner wall 78 of the casing section to the cover plate 122. Thus, the main seals and the bulkhead block flow of fluid from the high pressure area ahead of the bulkhead to the low pressure area behind it except through the turbine. The main seals are associated with matrix mounting and driving rollers bearing against the radially inner and outer surfaces of the rims 149 of the matrix. The main seals are rockable about an axis parallel to the axis of rotation of the matrix to align the seals with the matrix. Two loading devices 150 mounted on the regenerator casing are provided for each main seal to bias the driving rollers into engagement with the matrix. The main seals, the driving and supporting rollers, and the loading device will not be further described here, since they are subject matter of U.S. Patent No. 3,384,156. It should be noted, however, that the matrix is supported by the rollers which in turn are supported in wall 78 and cover 122.

Each regenerator matrix 66 cooperates with two rim or bypass seals 151 which act to prevent flow of air or gas between the matrix rim and the adjacent walls. These seals are preferably of the type disclosed in U.S. Patent No. 3,360,275, and need not be further described herein.

The matrix is rotated slowly by a drive train powered by the turbine. The drive train includes a pinion 153 fixed on the gas generator turbine shaft 60 in the fore and aft plane of the cross member of front frame section 17, a train of gears 154, 155, and 156 in the frame section, a clutch 157, outer shaft 158, bevel gearing 159, gears 160, and a cross shaft 162. The ends of shaft 162 are coupled by splined quill shafts 165 to a drive roller in each upper main seal so that the drive connection is flexible and tolerates displacement of the main seal relative to the engine frame. The roller so driven in the upper main seal corresponds to inner roller 163 in the lower main seal which, however, is not driven.

The clutch 157 is provided for interrupting the drive from the turbine to the regenerator matrices. Since the regenerator drive is by friction between rollers and the matrix rim, if foreign matter or some casualty to either matrix should cause it to seize or bind, the result would be continued slippage of the drive roller on the matrix, resulting in local wear and spoiling of the matrix rim. Means for controlling the clutch forms no part of our invention.

Considering now the arrangements for cooling the engine, principally the frame, it should be noted that the main frame 17, 18 and turbine frame 46 are disposed between the hot regenerator and the hot gas turbine. The turbine is surrounded by the hot regenerator. It is desirable to cool the frame and also such parts as the compressor and turbine shaft supports and the turbine case. For this purpose an air circulating blower or fan 170 is mounted on top of the compressor 5. The blower is driven by a shaft 171 splined to the shaft of gear 156. A sheet metal shroud 172 (FIGURE 1) connects the rear edges of the regenerator casing sections and an upper shroud 173 connects the upper edges of the regenerator casing sections, this shroud overlying the upper side member of the frame 17, 18. The forward portion of the shroud has side walls 175 extending to the cylindrical forward portion of the regenerator case. A duct 177 connects the interior of the shroud to the inlet of fan 170, which discharges through an outlet 178. The walls of the regenerator case are spaced from the main frame and, as previously pointed out, the regenerator case including the bulkhead is spaced from the turbine frame. The fan 170 acts to exhaust air from the spaces within the engine and thus to draw cooling air in from outside the engine. As previously pointed out, the bulkhead 87 is hollow and its outer ends are open to allow air to enter the engine. A baffle 180 within the bulkhead limits the flow of air through this large opening. Air also is drawn into the space between the regenerator casing sections and within the shroud, upward along the forward and rear cross members of the engine frame and also is drawn through the interior of the hollow stays 131. Air entering through the stays 131 ventilates the space between turbine shaft housing 28, 53 and the shrouds around the housing and is carried upward around the vertical portion of the main frame. Air entering through the bulkhead can flow over the turbine case and turbine frame 46 into the cooling shroud through the gap 182 (FIGURE 4) between the inner end of the bulkhead and the frame 46. The result of this circulation of cooling air is to keep the support members, the main frame and turbine frame, turbine case, and shaft supports at a much lower temperature than would otherwise exist.

It is important to maintain a reasonable temperature, preferably not above 300° F., for these parts to avoid possible warping or distortion of the frame and resulting misalignment of the parts of the turbine. In this connection, it should be borne in mind that the alignment of the rotors and stators of the turbines depends upon the frame. There is no support within the turbine from the casing to the shafts. The usual turbine embodies struts passing across the motive fluid path from the turbine case or stator to bearing supports on the bearing axis. These present some obstruction to motive fluid flow and are undesirable because they extend across the very hot motive fluid path. They are likely to warp and disturb the alignment of rotor and stator of the turbine. In the engine here described the rotors are aligned with the case 45 through the shaft supports, main frame, and turbine frame which are massive, rigid structures and which are cooled by the air circulation.

Referring again to the mechanical portions of the engine, the low pressure turbine power output shaft is connected by gearing within the case 8 to the main power output shaft 58. Shaft 57 is hollow and a shaft 184 extends through shaft 57 from the high pressure turbine to a splined coupling 185 at the rear of the gear box. Thus, it is possible to provide means for coupling the two turbines together, or coupling the compressor to the load, for power transfer or for dynamic braking. Mechanism for connecting the two turbines will not be described here but may follow the teachings of U.S. Patent No. 3,237,404.

The detailed description of the preferred embodiment of the invention for the purpose of explaining the principles thereof is not to be considered as limiting or restricting the invention, as many modifications may be made by the exercise of skill in the art.

We claim:
1. A regenerative power plant comprising, in combination,
   a gas turbine engine including a compressor, combustion apparatus supplied by the compressor, and a turbine energized by the combustion apparatus and coupled to drive the compressor;
   a rotary regenerator mounted on the engine connected to transfer heat from the turbine exhaust to air flowing to the combustion apparatus,
   the regenerator comprising a casing mounted on and supported by the engine,
   means mounting the casing to the engine with freedom for expansion with respect to the engine,
   a matrix rotatable in the casing,
   main and bypass seals in the casing cooperating with the matrix,
   and means supporting and rotating the matrix,
   the matrix, the said seals, and the supporting and rotating means being mounted in and supported by the said casing.

2. A power plant as recited in claim 1 including also means defining radially and axially displaceable sealing connections between the casing and the compressor and between the casing and the turbine.

3. A power plant as recited in claim 2 including also drive means on the engine for the regenerator,
   and a flexible driving connection from the drive means to the matrix rotating means.

4. A power plant as recited in claim 1 including also drive means on the engine for the regenerator,
   and a flexible driving connection from the drive means to the matrix rotating means.

5. A power plant as recited in claim 1 in which the means mounting the casing to the engine comprises a rigid frame and includes means providing for relative expansion connecting the frame to the engine and the regenerator, respectively.

6. A power plant as recited in claim 5 including means for circulating cooling air in heat exchange relation to the frame.

7. A gas turbine power plant comprising, in combination,
   a turbine including a stator and two rotors,
   a compressor including a stator and a rotor,
   the said rotors being coaxial and defining an engine axis;
   a main frame supporting the said stators and rotors, including
   two rigid side members disposed generally parallel to the engine axis and at opposite sides of the axis,
   front and rear cross members rigid with the side members joining the side members, and
   a shaft support fixed on each cross member;
   the turbine being disposed between the cross members and the compressor being ahead of the front cross member,
   a turbine support ring fixed to and rigid with the side members,
   means mounting the turbine stator on the ring locating the turbine stator positively axially and radially, with freedom for radial expansion;
   and means mounting the turbine rotors on the shaft support to support the said rotors coaxially with the stators through the connecting structure comprising the shaft supports, main frame, support ring, and turbine stator mounting means.

8. A power plant as recited in claim 7 in which the compressor is rigidly connected to the main frame through the shaft support on the front cross member.

9. A power plant as recited in claim 7 including a regenerator supported by the main frame.

10. A power plant as recited in claim 8 including also means for locating the regenerator on the main frame,
and flow directing means connecting the regenerator to the compressor and turbine, respectively,
the locating and flow directing means providing for relative expansion of the regenerator relative to the frame, compressor, and turbine.

11. A power plant as recited in claim 7 including also regenerators disposed on both sides of the main frame spaced from the main frame and the support ring.

12. A power plant as recited in claim 11 including also means for circulating cooling air over the main frame, support ring, and turbine stator.

13. A gas turbine power plant comprising, in combination,
coupled coaxial turbine and compressor means, the axis of said means constituting an engine axis,
a main frame extending generally axially of the engine, and encircling the turbine means,
a turbine frame, extending circumferentially around the turbine means transversely to the engine axis, mounted on the main frame,
turbine mounting means supporting the turbine means on the turbine frame with freedom for relative expansion and fixedly locating the turbine means,
a compressor support mounting the compressor means on the main frame with freedom for relative expansion axially of the engine, and
a shaft housing structurally connecting the turbine and compressor means within a motive fluid path from the compressor means to the turbine means.

14. A power plant as recited in claim 13 including also rotary regenerator means comprising a matrix at each side of the main frame rotatable about an axis generally perpendicular to both the engine axis and the main frame.

15. A power plant as recited in claim 14 including also a regenerator case comprising two sections meeting within the main frame to provide a complete enclosure.

16. A power plant as recited in claim 15 including also a forward support for the regenerator case on the shaft housing, and
a rear support for the regenerator case on the main frame,
both said regenerator case supports providing for relative expansion of the case and frame axially of the engine.

17. A power plant as recited in claim 16 including also means keying the regenerator case to the main frame locating the case axially of the engine and providing for relative expansion of the case and frame radially of the engine.

18. A power plant as recited in claim 15 in which the regenerator case defines an open zone around the turbine means isolating the turbine means from the regenerator, the open zone being ventilated.

19. A regenerative gas turbine power plant comprising, in combination,
coupled coaxial turbine and compressor means, the axis of said means constituting an engine axis,
a main frame extending generally axially of the engine, and encircling the turbine means,
a turbine frame, extending circumferentially around the turbine means transversely to the engine axis, mounted on the main frame,
turbine mounting means supporting the turbine means on the turbine frame with freedom for relative expansion and fixedly locating the turbine means,
a compressor support mounting the compressor means on the main frame with freedom for relative expansion axially of the engine,
a shaft housing structurally connecting the turbine and compressor means within a motive fluid path from the compressor means to the turbine means,
rotary regenerator means comprising a matrix at each side of the main frame rotatable about an axis generally perpendicular to both the engine axis and the main frame,
a regenerator case comprising two sections meeting generally in the plane of the main frame to provide a complete enclosure,
a forward support for the regenerator case on the main frame,
a rear support for the regenerator case on the main frame,
both said regenerator case supports providing for relative expansion of the case and frame axially of the engine,
means keying the regenerator case to the main frame locating the housing axially of the engine and providing for relative expansion of the case and frame radially of the engine,
and means providing forced cooling air circulation between the turbine and regenerator case and between the frame and regenerator case.

References Cited

UNITED STATES PATENTS

| | | | |
|---|---|---|---|
| 2,529,955 | 11/1950 | Morley | 60—39.31 XR |
| 2,972,230 | 2/1961 | Conklin et al. | 60—39.32 XR |
| 3,077,074 | 2/1963 | Collman et al. | 60—39.51 XR |
| 3,116,605 | 1/1964 | Amann et al. | 60—39.51 |
| 3,167,914 | 2/1965 | Savonuzzi | 60—39.51 |
| 3,267,674 | 8/1966 | Collman et al. | 60—39.51 |

CARLTON R. CROYLE, Primary Examiner

U.S. Cl. X.R.
60—39.51; 165—9